Figure 1:
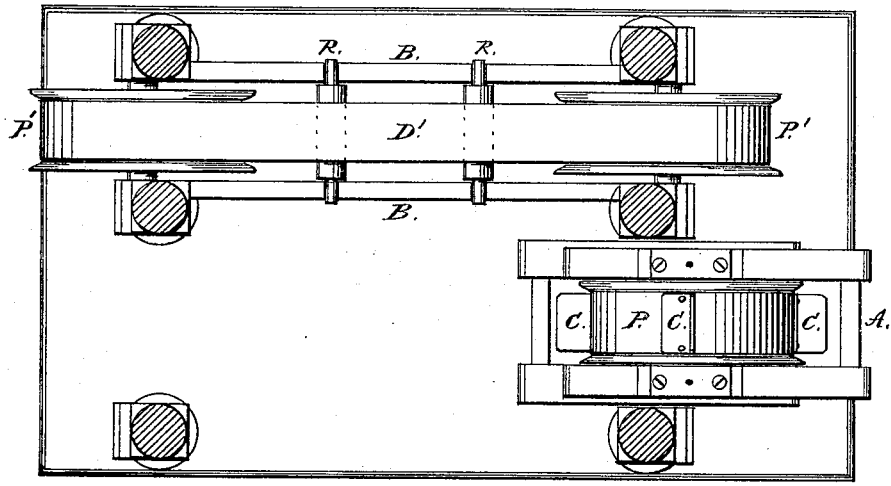

2 Sheets--Sheet 1.

T. KINGSFORD.
Apparatus for the Manufacture of Starch.

No. 145,213. Patented Dec. 2, 1873.

Attest;
F. W. Howard
W. P. Bell

Inventor;
Thomson Kingsford
By his Attorney
Chas. F. Stansbury

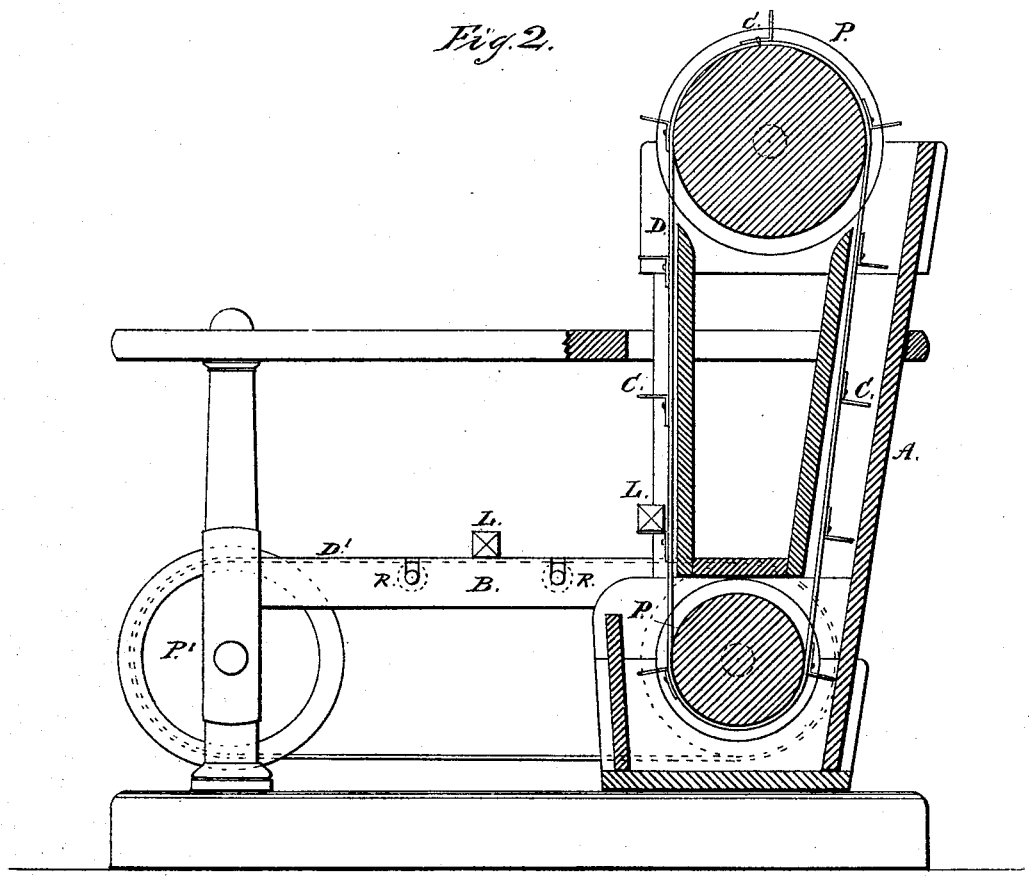

UNITED STATES PATENT OFFICE.

THOMSON KINGSFORD, OF OSWEGO, NEW YORK.

IMPROVEMENT IN APPARATUS FOR THE MANUFACTURE OF STARCH.

Specification forming part of Letters Patent No. 145,213, dated December 2, 1873; application filed August 21, 1873.

*To all whom it may concern:*

Be it known that I, THOMSON KINGSFORD, of the city and county of Oswego, State of New York, have invented a new Apparatus to be used in the Manufacture of Starch; and I do hereby declare the following to be a full and correct description of the same, reference being had to the accompanying drawings, in which—

Figure 1 is a top view or plan of the apparatus, and Fig. 2 is a side elevation of the same.

Similar letters of reference indicate corresponding parts in both the figures.

A is an elevator, consisting of a number of brackets or shelves, C, fastened to an upright endless belt, D, which passes over the upper and lower pulleys P P. B is a conveyer, which consists of a horizontal endless belt, passing over the pulleys P' P' at each end of the apparatus, as shown in the drawings. Motion is given to the apparatus by the upper pulley of the elevater A, which communicates motion to the conveyer, as shown. I usually arrange the machinery of the conveyer so that it can be reversed and run in either direction.

The object of my apparatus is to remove lumps of starch from one part of the starch-factory to another, and also to raise lumps of starch from one story to another, or to any desired elevation.

When starch is broken into lumps it is usually necessary to move the same to a more or less distant room for the purpose of partly drying them. Before I invented this apparatus it was customary, after breaking the starch into lumps, to put three or four of such lumps on a board used for the purpose, when one or more of the workmen carried them off to the drying-apartment. Again, to take the lumps from one elevation to another it was the custom for men to be stationed one above the other and hand the starch up lump by lump, until the desired elevation was reached.

It will be readily seen that by the use of my apparatus much time and labor are saved in performing these operations.

The working of my apparatus is easily understood. The conveyer B may be constructed of any length desired. The endless belt D' is supported by the rollers R. The lumps of starch L are placed on belt D', which is in motion, and carried to the place where they are wanted, and taken off, while the belt continues to move. The elevator A may be made of any required length.

When the conveyer and elevator are used together, the lumps may be taken from the conveyer and placed on the brackets of the elevator, and raised to the desired elevation, and then taken off. The belts and brackets move with the proper speed to allow workmen to take off and put on the lumps readily, in which they soon become expert after a little practice.

Having thus fully described my invention, what I claim, and desire to secure by Letters Patent, is—

The combination and arrangement of the horizontal endless belt D', passing over pulleys P' P', and supported by rollers R and the vertical endless belt D, to which are attached the shelves or brackets C, all constructed and operated in the manner and for the purpose specified.

The above specification of my said invention signed and witnessed at Oswego this 28th day of July, A. D. 1873.

THOMSON KINGSFORD.

Witnesses:
 GEO. N. BURT,
 RALPH HOWE.